(12) United States Patent
Antoni et al.

(10) Patent No.: US 6,772,659 B2
(45) Date of Patent: Aug. 10, 2004

(54) TOOL HEAD FOR USE IN MACHINE TOOLS

(75) Inventors: Arthur Antoni, Loechgau (DE); Rudolf Wiest, Besigheim (DE)

(73) Assignee: Komet Praezisionswerkzeuge Robert Breuning GmbH, Besigheim (DE)

( * ) Notice: Subject to any disclaimer, the term of this patent is extended or adjusted under 35 U.S.C. 154(b) by 141 days.

(21) Appl. No.: 10/234,974

(22) Filed: Sep. 4, 2002

(65) Prior Publication Data

US 2003/0061919 A1 Apr. 3, 2003

(30) Foreign Application Priority Data

Sep. 4, 2001 (DE) .......................................... 101 43 387

(51) Int. Cl.[7] .................................................. B23B 5/12
(52) U.S. Cl. .............................. 82/130; 82/133; 82/151
(58) Field of Search ..................... 82/130, 70.2, 133, 82/138, 151, 157, 132

(56) References Cited

U.S. PATENT DOCUMENTS

| | | | |
|---|---|---|---|
| 4,430,913 A | * | 2/1984 | Williamson .................. 82/70.2 |
| 5,072,636 A | * | 12/1991 | Gueli et al. .................... 82/132 |
| 5,894,771 A | * | 4/1999 | Braun et al. .................... 82/47 |
| 5,967,007 A | | 10/1999 | Scheer |

FOREIGN PATENT DOCUMENTS

| | | |
|---|---|---|
| DE | 32 37 587 A1 | 4/1984 |
| DE | 195 31 837 A1 | 3/1997 |
| DE | 197 02 219 A1 | 7/1998 |
| EP | 0 717 671 B1 | 7/1994 |

* cited by examiner

Primary Examiner—Willmon Fridie, Jr.
(74) Attorney, Agent, or Firm—Flynn, Thiel, Boutell & Tanis, P.C.

(57) ABSTRACT

A tool head for use in machine tools comprising a base body coupled to a machine spindle, comprising at least one tool-receiving means for a cutting tool, and comprising a rotatable slide mechanism, which eccentrically carries the tool-receiving means, and is rotated about an eccentric axis parallel to the base-body axis with respect to the base body in order to facilitate an adjusting of the cutting radius of the cutting tool. A second rotatable slide mechanism is provided which carries a second eccentric tool-receiving means, and is rotated about a second eccentric axis parallel to the base-body axis with respect to the base body in order to facilitate an adjusting of the cutting radius of the respective cutting tool. Furthermore, transmission means is arranged in the base body to facilitate a simultaneous driving of the two rotatable slide mechanisms.

35 Claims, 4 Drawing Sheets

TOOL HEAD FOR USE IN MACHINE TOOLS

FIELD OF THE INVENTION

The invention relates to a tool head for use in machine tools comprising a base body coupled to a machine spindle, comprising at least one tool-receiving means for a cutting tool, and comprising a rotatable slide mechanism, which eccentrically carries the tool-receiving means, and is rotated about an eccentric axis parallel to the base-body axis with respect to the base body in order to facilitate an adjusting of the cutting radius of the cutting tool.

BACKGROUND OF THE INVENTION

A tool head of this type is known from DE-A 197 02 219, in which a rotatable slide mechanism is provided, which is arranged near the center in the base body, and which can be adjusted through centrally arranged transmission elements. The external machining of elongated workpieces is not easily possible with this tool head.

SUMMARY OF THE INVENTION

Starting out from this, the basic purpose of the invention is to provide a tool head which is compact and lightweight, and with which also elongated workpieces can be machined with a high rotating speed.

The basic concept of the solution of the invention is that a second rotatable slide mechanism is provided, which carries a second tool-receiving means, and is rotated about a second eccentric axis parallel to the base-body axis with respect to the base body in order to facilitate an adjusting of the cutting radius of the respective cutting tool. A preferred embodiment of the invention provides that transmission means are arranged in the base body, which transmission means are coupled to both rotatable slide mechanisms so that they can be driven together with the adjustment of the reciprocal distance between the two cutting tools. The transmission means can advantageously be coupled to an additional machine spindle and can be driven by a machine located drive motor. It is fundamentally possible to drive the transmission means also with a drive motor integrated into the base body. The drive motor can thereby be configured as a stepping motor or as a servomotor. The transmission means have advantageously a speed-reduction gearing configured as a harmonic-drive or planetary transmission.

According to a further preferred embodiment of the invention, the two rotatable slide mechanisms are arranged diametrically opposite one another with reference to the base-body axis, and are adjusted radially oppositely directed through the common transmission means.

A further preferred embodiment of the invention provides that the base body has an axially central through opening, and that the transmission means form a hollow-shaft unit enclosing the through opening.

A preferred embodiment provides that the rotatable slide mechanisms each have an eccentric disk which is supported axially parallel eccentrically in the base body, which are axially adjacent to one another, and extend with axially parallel crank arms which carry the tool-receiving means, through a front opening of the base body. The outermost eccentric disk, which is adjacent to the front facing side of the base body, has thereby advantageously an opening for passage of the crank arm of the innermost eccentric disk. Since the crank arms carry out a circular motion about the base-body axis during operation of the rotatable slide mechanisms, the front-facing openings of the base body are configured as elongate holes preferably curved in their longitudinal extent. In order to cover the slotted holes, the tool-receiving means can carry outside shields. The opening in the outermost eccentric disk must have sufficient play of movement for the crank arm of the innermost eccentric disk, and is therefore advantageously also configured as a slotted hole.

A further advantageous development of the invention provides that the transmission means is coupled to the eccentric disks of the rotatable slide mechanisms through a common disk clutch concentrically supported in the base body. A particularly compact design is achieved when the eccentric disk and the disk clutch are arranged sandwichlike axially side-by-side in the base body. The disk clutch engages advantageously with two eccentrically arranged, axially parallel projecting keylike clutch members received in a respective one of the clutch grooves of the two eccentric disks. The clutch members form thereby a type of gear teeth which are moved along the clutch grooves during rotation of the disk clutch taking along the eccentric disks. The clutch member for the outmost eccentric disk extends through an opening of the innermost eccentric disk, which opening is preferably configured as a slotted hole.

In order to keep the center of the tool head free for passage of a workpiece or a sleeve, the eccentric disks and the disk clutch have also an opening surrounding the through opening. The eccentric disks of the rotatable slide mechanisms are advantageously supported in radial roller bearings, which are preferably configured as needle bearings, in the base body. Also the disk clutch can be supported in axial and/or radial roller bearings in the base body. The eccentric disks, which rest sandwichlike against one another, the disk clutch and the front-side base body lid are advantageously supported against one another through axial slide or roller bearings. In the case of slide bearings, the respective parts can be provided with a friction-reducing coating.

According to a preferred or alternative development of the invention, it is possible to provide a calibrating mechanism in order to calibrate the zero position of the at least one rotatable slide mechanism or a linear slide mechanism, which calibrating mechanism includes preferably a calibration counter arranged in the base body, which counter can be operated, for example, by a trip cam arranged on the driven side of the transmission means, the disk clutch or on one of the eccentric disks, and emits a calibrating signal to an external electronics of the calibrating mechanism. The calibrating mechanism can furthermore have an external microprocessor arrangement, which houses at least one electronically callable calibrating table or calibrating curve for the coordination of the relative rotation of the two spindles and the cutting radius.

A shifting of the masses does not result from the rotation of the rotatable slide mechanisms so that balancing masses are not needed. However, attention must be paid, when using rotatable slide mechanisms that during the adjusting operation, to not only the distance of the blades from the base-body axis that is changed but also the alignment of the blades with respect to the axis of rotation. For many cases of application this is indeed of a subordinate importance. An improvement in this respect can, however, be achieved in such a manner that the two tool-receiving means can be adjusted in dependency of the respective angle of rotation of the rotatable slide mechanism or of the cutting radius with a finite alignment of the cutting tool relative to the base-body axis with respect to the rotary body (compare DE-A 197 02 219). The tool-receiving means can be adjusted for this purpose by aligning a reference plane associated with the cutting tool with the base-body axis and with respect to the respective rotatable slide mechanism. In order to make this possible, it is suggested according to a preferred development of the invention that the tool-receiving means are arranged rotatably about an axis parallel to the eccentric axis of the rotatable slide mechanism in an eccentric bore of the respective rotary slide.

The tool head of the invention is particularly suited for the external machining, in particular for turning, cutting or contour turning of elongated workpieces received in the central through opening, in that the two cutting tools, which are diametrically opposite one another with respect to the through opening, are adjusted at their radial distance from one another by a common operation of the rotatable slide mechanisms.

A further advantageous use of the tool head of the invention is that the workpiece to be machined can be supported with respect to the center of the tool head end of the machine spindle.

The tool head of the invention can furthermore be advantageously utilized for receiving a sleeve in the center through opening for centering of a workpiece to be machined. The tool head of the invention is particularly suited for use in a machine tool with a double spindle, which has two spindles arranged concentrically to one another, and can be driven independently of one another.

BRIEF DESCRIPTION OF THE DRAWINGS

The invention will be discussed in greater detail hereinafter in connection with one exemplary embodiment, which is schematically illustrated in the drawings, in which.

DETAILED DESCRIPTION

Figure 1A:
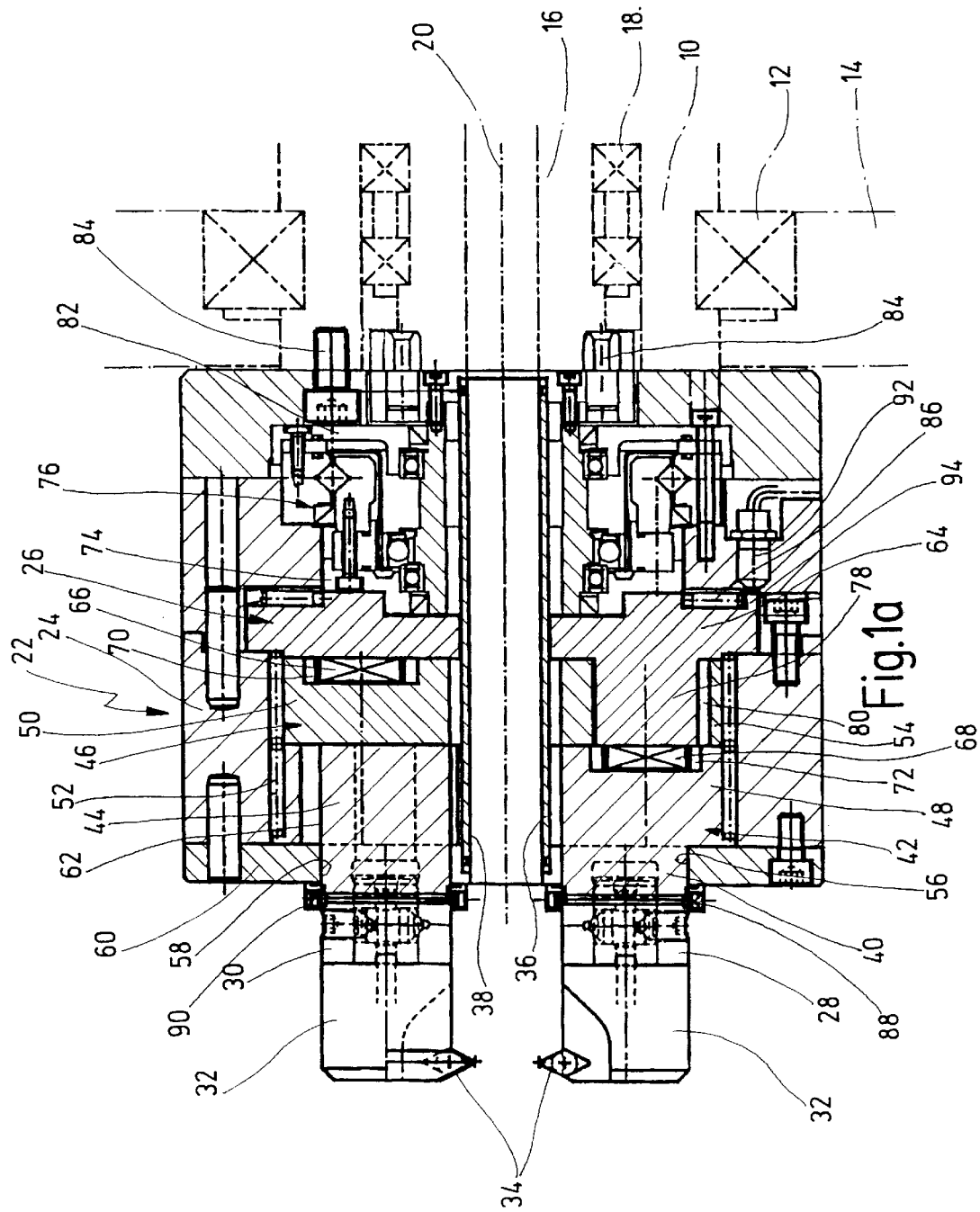
FIGS. 1a and 1b are two longitudinal cross-sectional views rotated at 90° relative to one another and illustrating a tool head with a center through and two rotary slides, which can be driven together.
Figure 1B:
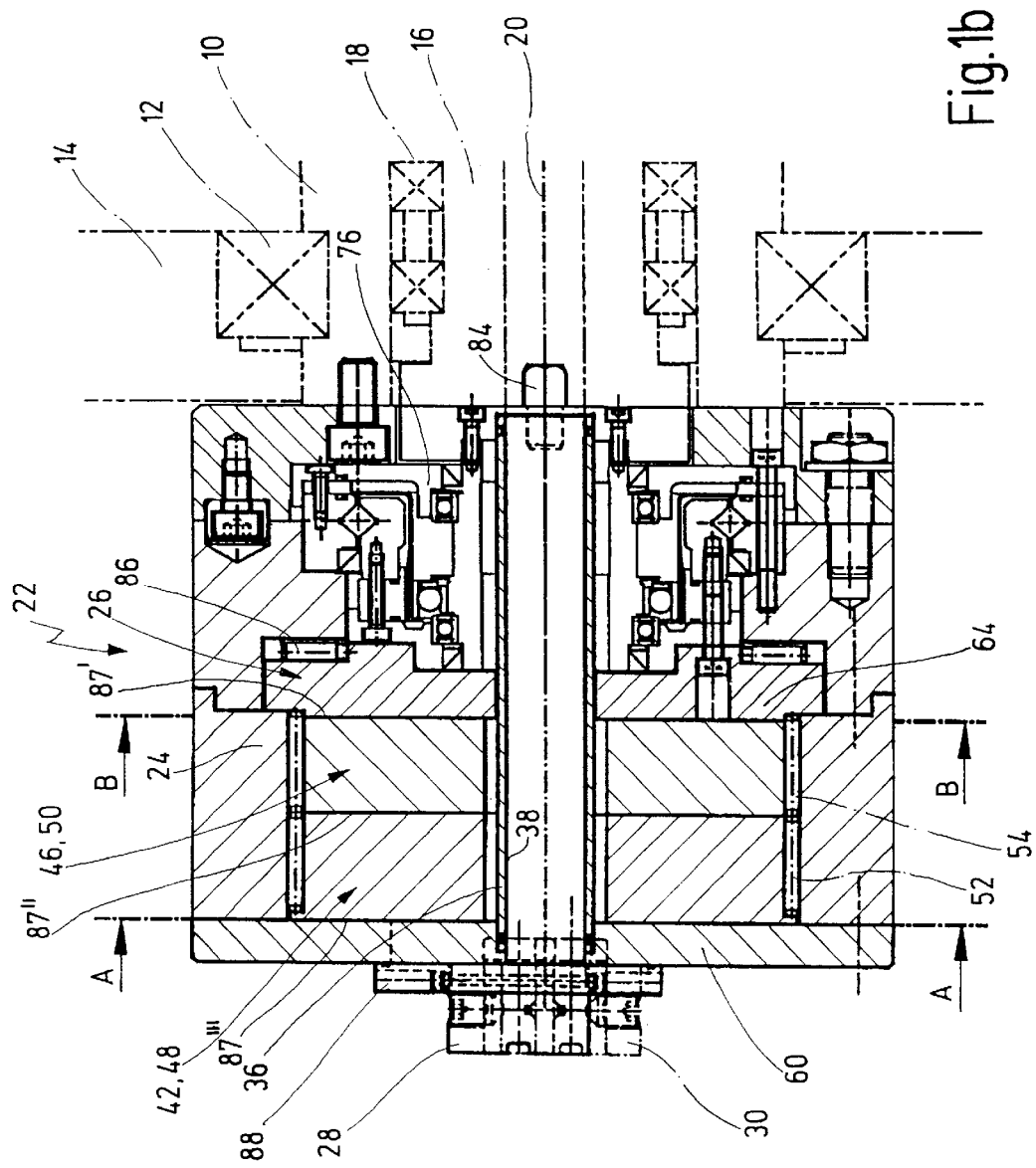
Figure 2B:
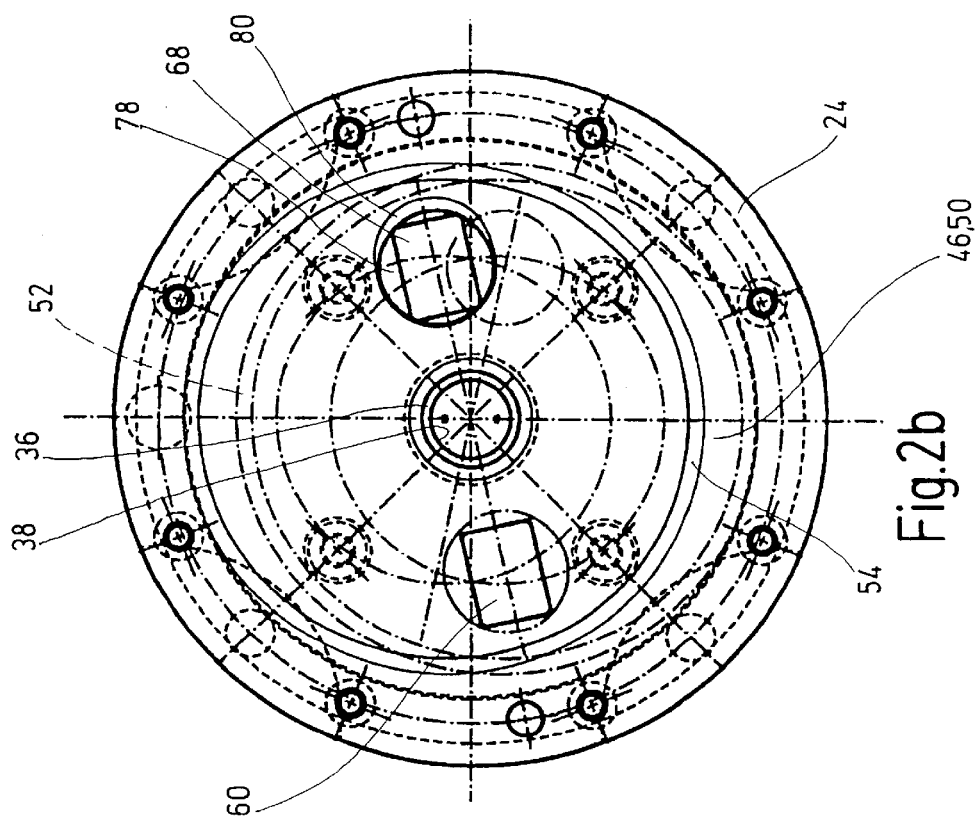
FIGS. 2a and 2b are two cross-sectional views of the tool head taken along the cross-sectional lines A—A and B—B of FIG. 1b.
Figure 2A:
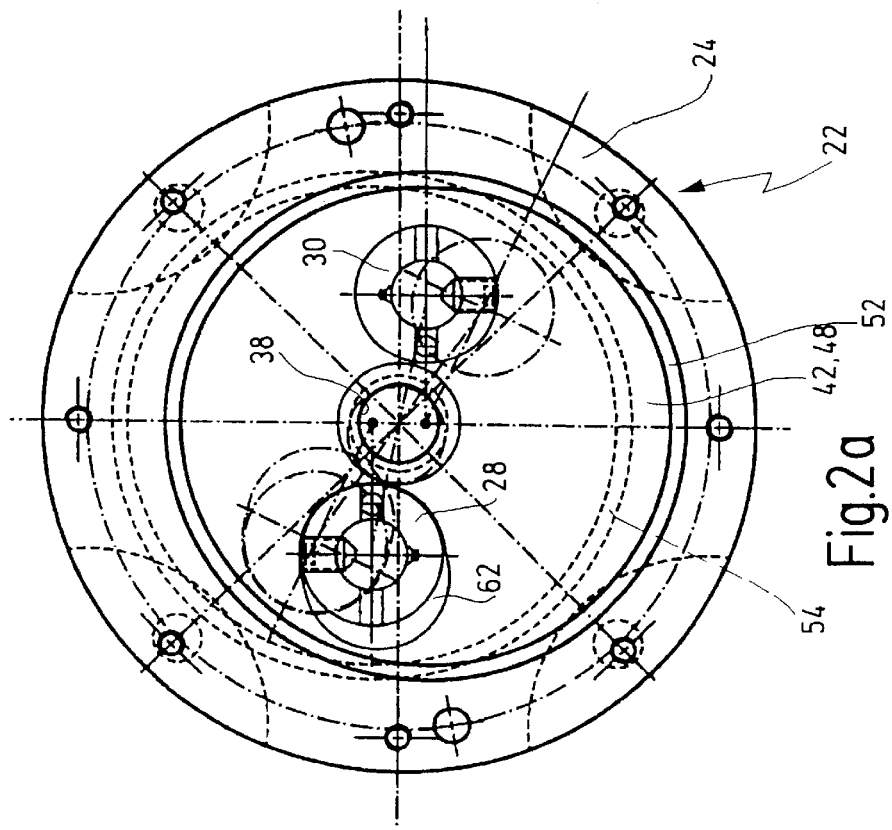

The tool head 22 illustrated in the drawings is designated for use in a machine tool having a double spindle system. The outer spindle 10 of the double spindle system is rotatably supported in the machine housing 14 via bearings 12, whereas the inner spindle 16 is concentrically and rotatably supported within the outer spindle via bearings 18. The outer spindle 10 and the inner spindle 16 can be driven about their common spindle axis 20 by not illustrated machine located drive motors.

The tool head 22 has a base body 24 which is fixedly coupled to the outer spindle 10 so that no relative movement occurs therebetween, and an adjusting mechanism 26 which is arranged in the base body 24 and is fixedly coupled to the inner spindle 16 so that no relative movement occurs therebetween, is provided for the two eccentrically arranged tool-receiving means 28, 30 arranged on the front facing side of the tool head. Two cutting tools 32 are respectively coupled to the two tool-receiving means 28, 30, which cutting tools 32 in the illustrated exemplary embodiment each carry a radially inwardly extending cutting blade 34. A hollow base body-fixed sleeve 36 is provided in the center of the tool head 22, which sleeve 36 provides a central through opening 38 coaxial with the spindle axis 20 for a workpiece to be machined or for a workpiece holder.

Figure 3:
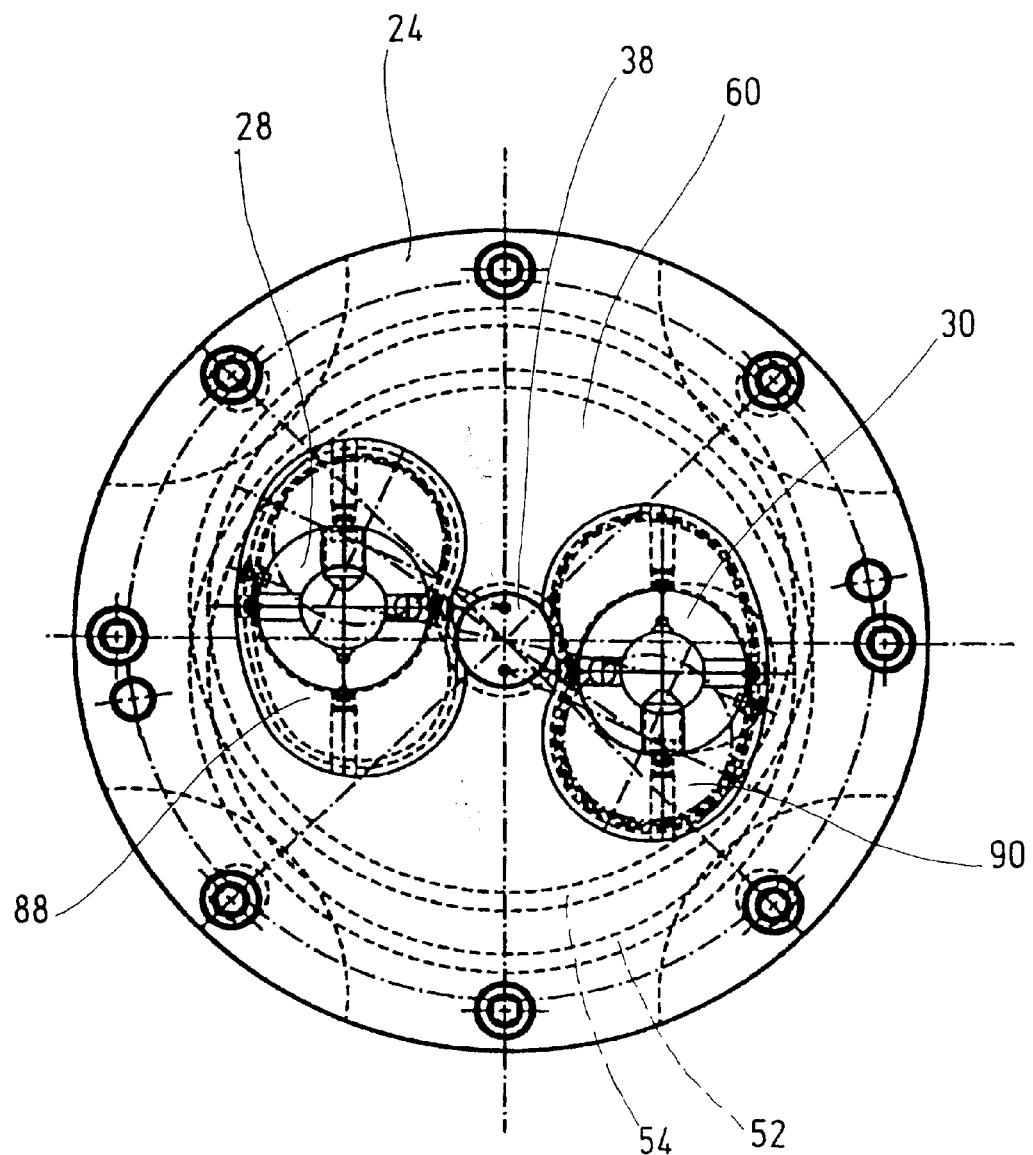
FIG. 3 is a front view of the tool head according to FIGS. 1a and 1b.

The two tool-receiving means 28, 30 are adjustable with respect to the base body 24 by the adjusting mechanism 26 facilitating an adjusting of the cutting radius of the cutting tool 32. The tool-receiving means 28 is for this purpose rigidly connected through an axially extending crank arm 40 fixed to a rotatable circularly-shaped slide plate 42 and the tool-receiving means 30 through an axially extending crank arm 44 fixed to a rotatable circularly-shaped slide plate 46. Both rotatable slide plates 42 and 46 each have a central axis of rotation that is eccentrically arranged relative to the spindle axis 20 as shown at $A_1$ and $A_2$ in FIG. 3. In other words, the slide plates 42 and 46 respectively define eccentric disks 48 and 50, which are arranged sandwichlike axially side-by-side in different eccentric bearings defined by needle rings 52, 54. The crank arms 40, 44 of the two rotatable slide plates extend through kidney-shaped holes 56, 58 in a base body lid 60. The kidney-shaped holes 56, 58 in the base body lid 60 are shielded to the outside by shields 88, 90 which laterally project over the tool-receiving means 28, 30. The crank arm 44 of the rotatable slide plate 46, which is the innermost slide plate, is furthermore guided through a kidney-shaped hole 62 in the rotatable slide plate 42, which is the outermost slide plate 42.

A disk clutch 64 is concentrically supported in the base body and is provided for rotatably driving the rotatable slide plates 42, 46, which disk clutch 64 engages on the one side thereof through keylike clutch members 66, 68 clutch grooves 70, 72 on the eccentric disks 48, 50, and is connected on its other side to the driven side 74 of a speed-reduction gearing 76 of the adjustment mechanism 26. The speed-reduction gearing 76 is designed as a harmonic-drive transmission. The clutch member 66, which is coupled to the outermost eccentric disk 48, is arranged on the front facing end of crank arm 78 which extends through a kidney-shaped hole opening 80 in the innermost eccentric disk 50. The speed-reduction gearing 76 is connected at its input end 82 to rearwardly projecting driving pins 84 which are fixedly coupled against relative rotation to the inner spindle 16. The disk clutch 64 is rotatably supported by an axial thrust needle bearing 86 with respect to the base body, whereas axial thrust slide bearings, which can be coated with a friction-reducing material, are arranged at the separating planes 87', 87'', 87''', namely, between the disk clutch 64 and the innermost eccentric disk 50, the innermost eccentric disk 50 and the outermost eccentric disk 48, and the outermost eccentric disk 48 and the base body lid 60.

In order to adjust the reciprocal radial distance between the cutting blades 34, the inner spindle 16 is rotated relative to the base body 24 about the spindle axis 20 by the machine control. The speed-reduction gearing 76 changes the rotations of the spindle through the driven side 74 into a finite angular rotation of the disk clutch 64, which in turn rotates through the clutch members 66, 68 the eccentric disks 48, 50 of the rotatable slide plates 42, 46 to a corresponding angle. The rotation results in an oppositely directed radius change in the area of the tool-receiving means 28, 30, which results in a change of the cutting radii of the cutting blades 34 and thus in a change of the distance between the cutting blades.

To calibrate the zero position of the adjusting range, a calibration counter 92 is housed in the base body 24, which calibration counter 92 is operated by a trip cam arrangement 94 on the disk clutch 64 and emits during each operation a signal to a calibrating circuit in the not illustrated machine control. The machine control includes in addition a microprocessor arrangement with a calibrating table, which can be called electronically, or a calibrating curve for the coordination of the motor rotations and the respective blade radius.

In summary, the following is to be stated: The invention relates to a tool head for use in machine tools comprising a base body 24 which is coupled to a machine spindle, comprising at least one tool-receiving means 28 for a cutting tool 32, and comprising a rotatable slide plate 42 which eccentrically carries the tool-receiving means and is rotatable about an eccentric axis parallel to the base-body axis and relative to the base body 24 in order to facilitate an adjusting of the cutting radius, of the cutting tool. According to the invention, a second rotatable slide plate 46 is provided which carries a second eccentric tool-receiving means 30 and is rotatable about a second eccentric axis parallel to the base-body axis, and relative to the base body 24 in order to facilitate an adjusting of the cutting radius of the respective cutting tool 32. Transmission means 76, 74 are furthermore housed in the base body, through which transmissions means 76, 74 the two rotatable slide plates 42, 46 are simultaneously driven.

Although a particular preferred embodiment of the invention has been disclosed in detail for illustrative purposes, it will be recognized that variations or modifications of the disclosed apparatus, including the rearrangement of the parts, lie within the scope of the present invention.

What is claimed is:

1. A tool head for use in machine tools comprising a base body configured for connection to a machine spindle, comprising at least one tool-receiving means for a cutting tool, and comprising a rotatable slide mechanism for eccentrically carrying the tool-receiving means and is rotatable about an eccentric axis which is parallel to the base-body axis and with respect to the base body in order to facilitate an adjusting of the cutting radius of the cutting tool, wherein a second rotatable slide mechanism carries a second eccentric tool-receiving means, and is rotatable about a second eccentric axis which is parallel to the base-body axis and with respect to the base body in order to facilitate an adjusting of the cutting radius of the respective cutting tool.

2. The tool head according to claim 1, wherein transmission means are arranged in the base body, which transmission means are coupled to both rotatable slide mechanisms.

3. The tool head according to claim 1, wherein transmission means are arranged in the base body, through which transmission means the two rotatable slide mechanisms are simultaneously driven.

4. The tool head according to claim 3, wherein the transmission means are coupled to an additional machine spindle and are configured to be driven by a machine-located drive motor.

5. The tool head according to claim 3, wherein the transmission means is driven by a drive motor integrated into the base body.

6. The tool head according to claim 5, wherein the drive motor is one of a stepping motor and a servomotor.

7. The tool head according to claim 4, wherein the drive motor is one of a stepping motor and a servomotor.

8. The tool head according to claim 2, wherein the transmission means have a speed-reduction gearing in the form of one of a harmonic-drive and planetary transmission.

9. The tool head according to claim 1, wherein the tool-receiving means of the two rotatable slide mechanisms are diametrically opposite one another with reference to the base-body axis.

10. The tool head according to claim 2, wherein the tool-receiving means of the two rotatable slide mechanisms are adjusted radially oppositely directed through the common transmission means.

11. The tool head according to claim 1, wherein the base body has a centrally-oriented through opening, and wherein the transmission means form a hollow-shaft unit enclosing the through opening.

12. The tool head according to claim 1, wherein the rotatable slide mechanisms each have an eccentric disk supported for movement about parallel axes, said eccentric disks being axially adjacent to one another, and have axially extending and parallel crank arms which carry the respective tool-receiving means oriented at a front-facing side of the base body.

13. The tool head according to claim 12, wherein the outermost eccentric disk adjacent to the front-facing side of the base body has an opening for passage of the crank arm on the innermost eccentric disk.

14. The tool head according to claim 12, wherein the front-facing side openings of the base body are configured as elongate and curved holes.

15. The tool head according to claim 14, wherein the tool-receiving means carry on the outside shields to cover the elongate and curved holes.

16. The tool head according to claim 13, wherein the opening in the outermost eccentric disk is configured as an elongate hole.

17. The tool head according to claim 12, wherein the transmission means are coupled through a common disk clutch concentrically supported in the base body to the eccentric disks of the rotatable slide mechanisms.

18. The tool head according to claim 17, wherein the eccentric disks and the disk clutch are arranged sandwich-like axially side-by-side in the base body.

19. The tool head according to claim 17, wherein the disk clutch is configured to couple two eccentrically arranged, axially parallel projecting keylike clutch members and a clutch groove of the eccentric disks.

20. The tool head according to claim 19, wherein the clutch member for the outermost eccentric disk extends through an opening of the innermost eccentric disk, which opening is configured as an elongate hole.

21. The tool head according to claim 12, wherein the eccentric disks have an opening surrounding the through opening.

22. The tool head according to claim 12, wherein the eccentric disks are eccentrically supported in the base body in radial roller bearings.

23. The tool head according to claim 17, wherein the disk clutch is supported with respect to the base body through an axial thrust and/or radial roller bearing.

24. The tool head according to claim 12, wherein the eccentric disks rest against one another through axial slide bearings or roller bearings.

25. The tool head according to claim 17, wherein each one of the eccentric disks rests through an axial slide bearing or roller bearing against the disk clutch or a front base body lid.

26. The tool head according to claim 1, wherein a calibrating mechanism is provided for calibrating the zero position of the rotatable slide mechanism with respect to the base body.

27. The tool head according to claim 26, wherein the calibrating mechanism includes a counter which is arranged in the base body, and which can be operated by a trip cam arranged on the driven side of the transmission means or on one of the eccentric disks.

28. The tool head according to claim 26, wherein the calibrating mechanism is configured to connect to an external microprocessor arrangement with at least one electronically callable calibrating table or calibrating curve for the coordination of the motor rotation and the respective cutting blade radius.

29. The tool head according to claim 1, wherein the tool-receiving means is adjusted in dependency of the respective angle of rotation of the rotatable slide mechanism or of the cutting radius in order to facilitate a finite alignment of the cutting tool relative to the base-body axis with respect to the respective rotatable slide mechanism.

30. The tool head according to claim 29, wherein the tool-receiving means is adjusted by aligning a reference plane associated with the cutting tool with the base-body axis and with respect to the respective rotatable slide mechanism.

31. The tool head according to claim 29, wherein the tool-receiving means are arranged rotatably about an axis parallel to the eccentric axis of the rotatable slide mechanism oriented in an eccentric bore of the respective rotatable slide mechanism.

32. The tool head for use in machine tools comprising a base body coupled to a first machine spindle, and comprising at least one slide mechanism coupled to a second spindle concentric to the first machine spindle through transmission means arranged in the base body, which is moved with respect to the base body, and carries preferably a tool-receiving means for a cutting tool, wherein a calibrating mechanism arranged in the base body for calibration of the zero position of the at least one slide mechanism with respect to the base body.

33. The tool head according to claim 32, wherein the calibrating mechanism includes a calibration counter arranged in the base body and operable through a trip cam arranged on the driven side of the transmission means.

34. The tool head according to claim 32, wherein the calibrating mechanism has a preferably external microprocessor arrangement with at least one electronically callable calibrating table or calibrating curve for the coordination of the relative rotation between the first and second spindle and the cutting radius of the cutting tool arranged on the slide.

35. The tool head for use in machine tools comprising a base body coupled to a first machine spindle, and comprising at least one slide mechanism coupled to a second spindle concentric to the first machine spindle through transmission means arranged in the base body, which is moved with respect to the base body, and carries preferably a tool-receiving means for a cutting tool, wherein a calibrating mechanism, which has an external microprocessor arrangement with at least one electronically callable calibrating table or calibrating curve for the coordination of the relative rotation between the first and second spindle and the cutting radius of the cutting tool arranged on the slide mechanism.

* * * * *